United States Patent [19]

Voll

[11] Patent Number: 4,698,913

[45] Date of Patent: Oct. 13, 1987

[54] APPARATUS AND CONTINUOUS METHOD FOR THE MULTISTAGE TREATMENT OF FINELY DIVIDED SOLID SUBSTANCES WITH GASES

[75] Inventor: Manfred Voll, Erlensee, Fed. Rep. of Germany

[73] Assignee: Degussa Aktiengesellschaft, Frankfurt, Fed. Rep. of Germany

[21] Appl. No.: 779,557

[22] Filed: Sep. 24, 1985

[30] Foreign Application Priority Data

Sep. 29, 1984 [DE] Fed. Rep. of Germany ....... 3435862

[51] Int. Cl.$^4$ ........................... F26B 3/16; F26B 17/10
[52] U.S. Cl. ...................................... 34/10; 34/57 A; 423/460
[58] Field of Search ................ 423/460, 461; 502/434; 34/57 A, 57 E, 10, 211

[56] References Cited

U.S. PATENT DOCUMENTS 3,584,848 6/1971 Kiyonaga et al. .................. 34/57 E
4,230,602 10/1980 Bowen et al. ....................... 502/434
4,366,138 12/1982 Eisenmenger et al. ............. 423/445

Primary Examiner—Larry I. Schwartz
Attorney, Agent, or Firm—Beveridge, DeGrandi & Weilacher

[57] ABSTRACT

A continuous process for the successive treatment of finely divided solid materials which are fluidizable at low gas velocities wherein at least two different gases or gas mixtures are utilized and wherein the fluidized bed is held at a constant level in a countercurrent system. The individual gaseous treating materials are conveyed to the different zones of the treatment reactor whereby the cross-section in each zone is chosen so that an essentially constant linear stream velocity of the gas over the total length of treatment is attained whereby the length of the individual successive zones is determined so that in each zone the desired treatment process which is intended to be carried out runs through its desired course.

16 Claims, 1 Drawing Figure

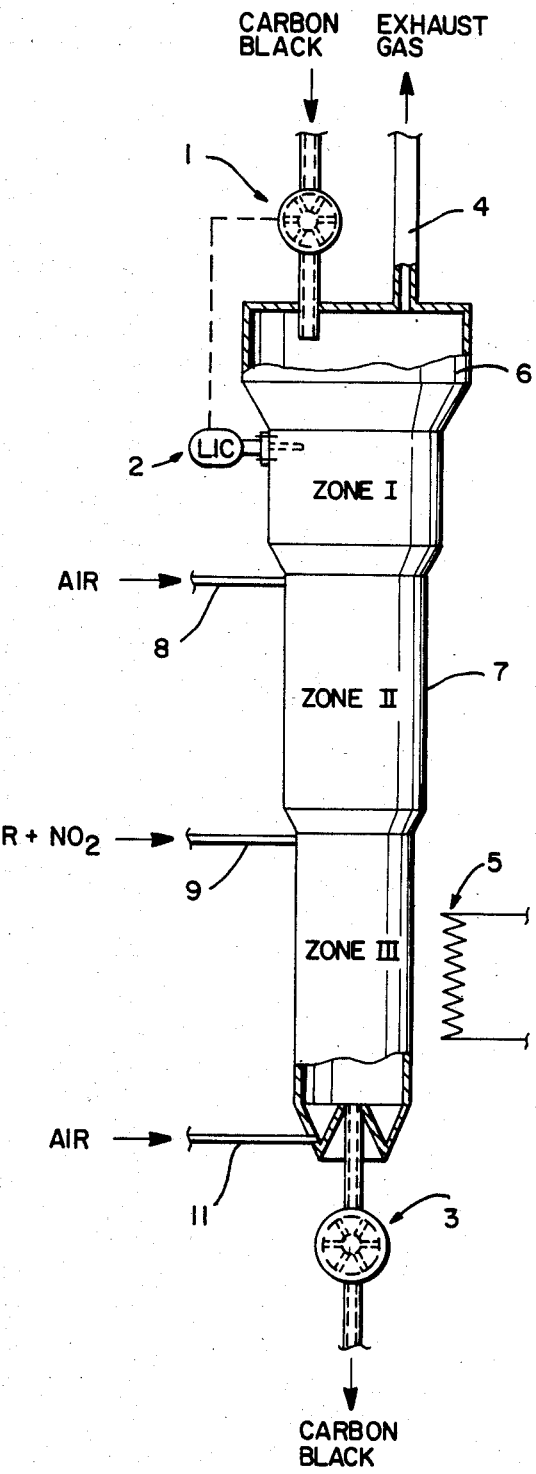

APPARATUS AND CONTINUOUS METHOD FOR THE MULTISTAGE TREATMENT OF FINELY DIVIDED SOLID SUBSTANCES WITH GASES

The present invention relates to a continuous method for the successive treatment in series of a finely divided solid substance with at least two different gases or gas mixtures, the solid substance being fluidizable at a low gas velocity of 0.5 to 10, preferably 1 to 5 cm per second, in a fluidized bed which is held and controlled at a constant level in a countercurrent manner of operation.

The method of the present invention has as its object to provide in a single operation a multistage treatment of a solid substance in a succession of zones with gases of various compositions and where the treatment zones can be at the same or different temperatures. The present invention thereby permits the combination into a single overall operation of previous operations which were separately carried through with readily fluidizable solid materials such as carbon black or finely divided oxides such as pyrogenically prepared silica, zirconium oxide, titanium dioxide, aluminum oxide and others.

Within such individual and separately carried out operations, there may be included chemical as well as physicochemical surface treatments such as surface area oxidation, hydrophobic treatments, adsorption, desorption, tempering, etc. These processes and the conditions therefor are well known in the art. Frequently, it is necessary to carry out a plurality of these operations in order to obtain a solid material with the precise surface characteristics that are desired. Examples of such previous operations which were separately carried out from each other are:

(A) The after treatment of carbon blacks; i.e.
  1. Drying.
  2. Surface area oxidation with nitrogen oxide/air mixtures.
  3. Desorption of residual adhering nitrogen oxides.
(B) The treatment of pyrogenically prepared silica in order to produce hydrophobic characteristics; i.e.
  1. Drying with partial condensation of silanol groups attached to the outer surfaces.
  2. Conversion with alkylated halogen silanes or silizanes, etc.
  3. If necessary, deacidification.
(C) Certain processes for the lowering of the so-called extractable content of carbon blacks
  1. Treatment with superheated steam.
  2. Treatment with hot air.

The present invention opens up a method for the carrying out of a plurality of such operations in a single, continuously operating process. Compared with the given level of technology, the present invention provides a method which brings about considerable simplification and an improvement in the economics of the technology.

It is therefore the object of this invention to provide a continuously operating method for the successive treatment of a readily fluidizable finely divided solid material with at least two different gases or gas mixtures, at a relatively low gas velocity of 0.5 to 10, preferably 1 to 5 sec., in a fluidized bed in a countercurrent stream mode of operation, which bed is maintained at a constant level. The method of the present invention is thereby characterized in that the individual treatment gases are introduced into various zones in the overall treatment reactor length whereby the cross-section in each of the zones is so determined that an essentially constant linear stream velocity of the gases is maintained over the total length of the treatment reactor length, and whereby the length of the individual zone one right after the other is determined so that the treatment process which is to be carried through in each zone is able to run to its desired stage of completion.

The method of the present invention utilizes for the purpose of maintaining a constant level of the fluidized solid material in the fluidized bed, one of the many suitable signal providers for the setting of the prevailing conditions, the signal means of which is connected to and controls a valve or charging means for the finely divided solid material. In this way, it is possible to obtain two methods of operation. The first is provided whereby the treated solid material can be withdrawn in a mass stream that is constant with time and the initial solid material is introduced in such an amount that the level of the fluidized bed is held constant. The second mode of operation arises in that the initial solid material is introduced in a mass stream that is maintained constant with time and the treated solid material is withdrawn in such an amount that the level of the fluidized bed is maintained constant.

The calculation of cross-section and length of the individual treatment zones to carry out the operational procedures according to the present invention with any given system of solid material and gases takes into account the characteristics of the following parameters:
  1. The desired through-put of the solid material.
  2. The gas-solid material ratio.
  3. The treatment temperature.
  4. The optimal gas velocity for fluidization of the solid material.
  5. Dwell time.
  6. Solid material density in the fluidized condition.

For every treatment zone in the overall reaction system there may be determined a most economical gas through-put which is dependent upon the desired solid material through-put and the gas/solid material ratio, and out of these factors, the temperature and the gas velocity for fluidization, the diameter of the respective treating zone and from the cross-section, the dwell time and the solid material density in the fluidized condition, the length of the treating zone.

The data utilized for the calculations with the exception of the free choice of the solid material through-put must be determined experimentally; however, these can also be extrapolated from the known individual steps carried out in other processes.

With the combination of the individual treating operations in accordance with the present invention into a single apparatus, a number of advantages arise, including the elimination of the means for transporting solid materials between the various apparatus of a separated process operations and the plurality of dosing or injection sites. This means the quantity of necessary apparatus is thereby significantly reduced. The coordination of the operational loads between individual stages of apparatus is thereby rendered unnecessary. The method of the present invention is however limited with respect to the succession of treating steps in that the exhaust gas of a particular treating step does not disturb the process that is intended to take place in the next successive zone.

To illustrate the arrangement of an apparatus suitable for carrying out the method of the present invention, the following example is presented, together with the accompanying drawing which shows a schematic representation of an apparatus utilized for the carrying out of the method of the invention.

EXAMPLE:

The method of the present invention which is suitable for a wide variety of gas/solid material reactions is illustrated further herein in the following example with a three step fluidized bed reactor for the oxidation of carbon black with air and $NO_2$ (as catalyst) and the subsequent desorption of excess $NO_2$.

According to the drawing, the carbon black is introduced into the reactor through the action of valve (1). The valve is controlled by a levelling control (LIC - level indicator control) (2) with an optical signal providing apparatus according to German patent application No. P 34 23 580.9-41. It should be understood that any known optical or other level sensing means may be used herein. The carbon black flows through the three stage vertical reactor (7) which is divided into zone I, zone II, and zone III. At the bottom end of zone I, there is provision made for introduction of air through line (8). At the bottom end of zone II, there is provision made for introduction of air and $NO_2$ through line (9), and at the bottom end of zone III, there is provision made through line (10) for the injection of additional air. After the carbon black passes through the three reaction zones I, II and III where it is treated with a variety of gaseous treating agents as indicated, the end product may be withdrawn through a withdrawl valve (3) which operates at constant rotational speed. The total exhaust gas of the reactor is vented at the head of the reaction vessel (7) through vent (4).

According to this example, in zone I, a preoxidation step of the highly reactive initial carbon black is conducted.

In zone II, the main reaction is carried out; namely, an oxidation of the carbon black with air and $NO_2$.

In zone III, a desorption reaction is carried out with the addition of fluidizing air material to desorb the excess or residual adhering $NO_2$ from the zone II oxidation step.

The fluidizing air is introduced at the lower end of zone III through a plurality (not shown) of tangentially oriented injection lines and streams in an upward direction at a low velocity.

In addition to maintaining the finely divided solid material in an agitated condition, the air supports the desorption reaction in that it conveys the desorbed $NO_2$ back into the reaction zone II.

Because the desorption reaction is weakly endothermic, zone III is maintained at the desorption temperature by utilizing heating means (5).

At the lower end of the zone II, the air and $NO_2$ is injected into the system preferably utilizing a plurality of tangentially oriented injection ports (not shown). The $NO_2$ concentration in the air is chosen in a such a manner that after the mixing therewith of the desorbed $NO_2$ containing gas which comes up from zone III, the desired treating concentration for zone II is attained.

The gas which moves from zone II up into zone I is already largely free of oxygen content, i.e. it is an oxygen poor gas, and therefore for the preoxidation step of the carbon black, there is introduced at the lower end of zone I additional air through tangentially oriented introduction lines.

In zones I and II, the heat is selected or controlled so that with suitable insulation, no additional heat is necessary in order to maintain the reaction temperature.

Located above reaction zone I, there is arranged a settling zone (6) of larger diameter than zone I in which there should be no fluidized carbon black because of the influence of the level control means which regulates this initial carbon black charging port, and further because the stream velocity of the gas is controlled so far below the sink velocity of the solid material particles that essentially no solid material is vented up through the exhaust gas line (4).

The data that is necessary for the proper arrangement and operation of the reactors; namely, the desired solid material through-put (a) and the experimentally determined process parameters or process parameters determined by extrapolation from known individual steps (b) to (f) are set forth in the upper section of the following table, separated for every reaction zone, as an illustrative embodiment of the invention.

TABLE

|  |  | Zone III | Zone II | Zone I |
|---|---|---|---|---|
| (a) | Solid material through-put (Kg)(h) | 12 | 12 | 12 |
| (b) | Gas/solid material ratio ($Nm^3$/kg) | 0.30 | 0.44 | 0.72 |
| (c) | Temperature (°C.) | 275 | 250 | 240 |
| (d) | Stream velocity of the gas (cm/sec) | 1.6 | 1.4 | 1.6 |
| (e) | Dwell time of the solid material (h) | 0.5 | 1.0 | 0.5 |
| (f) | Density of the solid material in the fluidized condition ($kg/m^3$) | 13 | 15 | 15 |
| (g) | Gas through-put ($Nm^3$/h) | 3.64 | 5.22 | 8.57 |
| (h) | Gas injection ($Nm^3$/h) | 3.64 | 1.58 | 3.35 |
| (i) | Reactor diameter (mm) | 401 | 501 | 596 |
| (k) | Length of the reaction zone (m) | 3.67 | 4.07 | 1.42 |

In the lower section of the table, there is represented the calculated operational data which are calculated from the initial data (a) through (f). It has been determined that the reactor is preferably operated at normal pressure. The gas through-put (g) is obtained from the desired solid material through-put (a) of 12 kg/h and from the experimentally determined most economical gas-solid material ratio (b) for each zone. The quantity of necessary gas (h) for introduction into every zone is arrived at by taking the difference between the gas through-put (g) in the designated zone and the gas through-put in the immediately preceding zone located at a lower point in the reactor.

Therefore, for example in zone II, a gas volume of 1.58 $Nm^3$/h must be introduced so that together with the gas volume in zone III of 3.64 $Nm^3$/h a calculated gas through-put of 5.22 $Nm^3$/h is attained. When a $NO_2$-treatment concentration of 3.7 volume percent is desired in zone II, then the gas that is introduced in zone II must contain 12.2 volume % $NO_2$.

The diameter (i) of the individual reaction zones III, II and I calculated from the gas through-put (g), the experimentally obtained optimal stream velocity (d) and the temperature (c) is determined for the foregoing model to be 401, 501, and 596 mm, respectively.

From the solid material through-put (a), the density of the solid material in the fluidized condition (f) in the various selected steps at the indicated temperature and stream conditions and the dwell time (e) chosen for the carrying out of the several reactions is then calculated in the table for the given lengths of the individual reaction zones (k).

Because in the given example, the amounts of gas (oxygen in the air) used up in the reaction system, based on the total gas through-put is relatively low, the quantity of gas that was used up was ignored in the calculations. In principle however, in order to maintain the necessary stream velocity for the desired fluidization for reactions which use up a considerable quantity of gas in the reactions, a narrowing of the reaction zones towards the upper end of the overall reactor may be necessary. Alternatively, it may be necessary to add additional gas along an unenlarged reaction zone.

The fluidized bed reactor of the present invention may be constructed of materials that are customarily or otherwise used in the industry for the construction of fluidized bed reactors.

Further variations and modifications of the foregoing invention will become apparent to those skilled in the art from a study and consideration of the foregoing specification and are intended to be encompassed by the claims appended hereto.

The entire disclosure and contents of German patent application No. P 34 35 862.5 is relied on and incorporated by reference herein.

I claim:

1. A continuous method for the successive treatment of readily fluidizable, finely divided solid material with at least two different gases or gas mixtures comprising providing a vertical reaction apparatus formed of a plurality of distinct zones, introducing finely divided solid material at the upper end of said reaction apparatus and into a first zone, introducing a first fluidizing gaseous material at the lower end of said first reaction zone so that the gaseous fluid and the finely divided solid material are in countercurrent flow, introducing a plurality of individual treating gaseous material into a plurality of locations in said reaction apparatus, at least one of said plurality of treating gases being different from said first fluidizing gaseous material, the cross-section of each such zone be determined so that an essentially constant linear stream velocity of the gas is obtained over the total length of the treatment zone and the length of the individual reaction zones being determined so that in each zone the desired treatment is carried out to the desired degree, the level of the fluidized bed being maintained constant by sensing means located above said first zone and wherein the gas velocity ranges from 0.5 to 10 cm/sec.

2. The method of claim 1, wherein the gas velocity ranges from 1 to 5 cm/sec.

3. The method of claim 1, wherein the cross-section of the vertical reaction apparatus has three different sizes corresponding to three reaction zones ranging from a maximum at the top of the reactor to an intermediate at the center of the reactor, to the smallest diameter at the lower end of the reactor.

4. The method of claim 1, wherein the reactor has a solid material charging means at the upper end and a product removal means at the bottom end.

5. The method of claim 1, wherein the reactor is fitted at its upper end with an optical level control sensor.

6. The method of claim 1, wherein carbon black is treated with oxygen in a first zone, is subsequently treated with oxygen and nitrogen oxide in a second zone and is finally treated with air in a third zone and is thereafter recovered.

7. The method of claim 5, wherein the sensor controls the flow of solid material being charged to said reactor to maintain a constant level in said reactor.

8. A continuous method for the successive treatment of readily fluidizable, finely divided solid material to obtain a modification of the surface properties of said solid material, comprising providing a reactor apparatus, introducing the finely divided solid material at one end of said reactor and introducing a fluidizing gaseous material at the other end of said reactor so that said gaseous material and the finely divided solid material are in countercurrent flow, introducing a treating gaseous material into said reactor at a location between said one end and said other end, said treating gaseous material being capable of reacting with the surfaces of the finely divided solid material to bring about said modification, introducing at least one other gaseous material into said reactor at a location between said one end and said other end which is different in composition from said treating gaseous material, maintaining an essentially constant linear stream velocity of gaseous material through said reactor, the reactor having a length that is determined so that the treating gaseous material can react sufficiently to achieve the desired modification and wherein the gas velocity ranges from 0.5 to 10 cm/sec.

9. The method of claim 8, wherein the gas velocity ranges from 1 to 5 cm/sec.

10. The method of claim 8, wherein the temperature in the reactor may be uniform or different at different locations along the length of the reactor.

11. The method of claim 8, wherein the reactor is a vertical reactor having three different reaction zones of different cross-section.

12. The method of claim 8, wherein the reactor has a solid material charging means at the upper end and a product removal means at the bottom end.

13. The method of claim 8, wherein the reactor is fitted at its upper end with a level control sensor.

14. The method of claim 8, wherein the reactor is fitted at its upper end with an exhaust gas vent.

15. An apparatus for the continuous successive treatment of a readily fluidizable, finely divided solid material comprising a vertical reactor divided into a plurality of reaction zones wherein each zone has a different cross-sectional area ranging from a larger diameter in the upper most zone to a smaller diameter in the lower most zone, each of said zones being provided with means for introducing a fluidizing gaseous material, solid material feed means located at the top of said reactor to feed solid material into the upper most zone of the reactor, product recovery means located at the bottom of said reactor for recovering solid material after having passed through the reactor, exhaust gas vent means at the top of said reactor, level sensing means located above the upper reaction zone and below the solid material feed means.

16. The apparatus as defined in claim 15, wherein said level sensing means are connected to and control solid material feed means.

* * * * *